United States Patent
Frey (10) Patent No.: US 10,730,424 B2
(45) Date of Patent: Aug. 4, 2020

(54) DEVICE FOR FASTENING A HEADREST OF A VEHICLE SEAT TO A BACKREST OF THE VEHICLE SEAT AND VEHICLE SEAT

(71) Applicant: Ford Global Technologies, LLC, Dearborn, MI (US)

(72) Inventor: Matthias Frey, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/199,611

(22) Filed: Nov. 26, 2018

(65) Prior Publication Data
US 2019/0176672 A1  Jun. 13, 2019

(30) Foreign Application Priority Data
Dec. 7, 2017 (DE) .................. 10 2017 222 166

(51) Int. Cl.
| | | |
|---|---|---|
| B60N 2/80 | (2018.01) | |
| B60N 2/806 | (2018.01) | |
| B60N 2/809 | (2018.01) | |
| B60N 2/897 | (2018.01) | |
| B60N 2/803 | (2018.01) | |

(52) U.S. Cl.
CPC ............ B60N 2/897 (2018.02); B60N 2/809 (2018.02); *B60N 2/803* (2018.02)

(58) Field of Classification Search
CPC ......... B60N 2/803; B60N 2/809; B60N 2/897
USPC ................................................ 297/391, 410
See application file for complete search history.

(56) References Cited

U.S. PATENT DOCUMENTS

| 4,427,233 A | * | 1/1984 | Matumoto | B60N 2/826 297/391 |
|---|---|---|---|---|
| 5,667,276 A | * | 9/1997 | Connelly | B60N 2/815 297/410 |
| 5,788,250 A | * | 8/1998 | Masters | B60N 2/826 297/410 |
| 5,816,658 A | * | 10/1998 | Wallis | B60N 2/815 297/410 |
| 5,927,813 A | | 7/1999 | Nemoto | |
| 6,296,316 B1 | * | 10/2001 | Hann | B60N 2/821 297/391 X |
| 7,338,130 B2 | | 3/2008 | Daume | |
| 7,410,219 B2 | * | 8/2008 | Kraft | B60N 2/809 297/410 |
| 7,954,899 B2 | * | 6/2011 | Chen | B60N 2/809 297/410 |
| 8,038,220 B2 | | 10/2011 | Liu et al. | |

(Continued)

*Primary Examiner* — Rodney B White
(74) *Attorney, Agent, or Firm* — David Coppiellie; Price Heneveld LLP (57) ABSTRACT

A device for fastening a headrest to a backrest of a vehicle seat comprises first and second guide units for receiving first and second headrest columns. First and second receiving units fixed on the backrest receive sleeve-like portions of the first and second guide units. The second guide unit comprises a locking mechanism for locking various vertical positions of the second headrest column relative to the second guide unit. At least one rib is arranged on an outer lateral surface of each sleeve-like portion. At least one recess, in which the rib of the respective guide unit engages in a positive locking manner, is arranged on each receiving unit. A width of the rib of the first guide unit is greater than a width of the recess of the second receiving unit.

12 Claims, 4 Drawing Sheets

(56) References Cited

U.S. PATENT DOCUMENTS

| | | |
|---|---|---|
| 8,474,913 B2 | 7/2013 | Line |
| 9,403,456 B2 | 8/2016 | Ozaki |
| 2003/0222491 A1* | 12/2003 | Isaacson ............... B60N 2/815 297/410 |
| 2004/0021360 A1* | 2/2004 | Key ........................ B60N 2/80 297/391 X |
| 2005/0012374 A1* | 1/2005 | Isaacson ............... B60N 2/815 297/410 |
| 2005/0184572 A1* | 8/2005 | Holdampf ................ B60N 2/80 297/391 |
| 2015/0001907 A1* | 1/2015 | Hagan ................... B60N 2/897 297/410 |
| 2015/0042142 A1* | 2/2015 | Hesterberg ............ B60N 2/809 297/391 |
| 2015/0123445 A1* | 5/2015 | Mueller ................ B60N 2/815 297/410 |
| 2015/0329021 A1* | 11/2015 | Aquillue ................ B60N 2/80 297/391 |

* cited by examiner

DEVICE FOR FASTENING A HEADREST OF A VEHICLE SEAT TO A BACKREST OF THE VEHICLE SEAT AND VEHICLE SEAT

FIELD OF THE INVENTION

The present invention generally relates to a vehicle seat for a motor vehicle and more particularly relates to a device for fastening a headrest to a backrest of the seat which is connected to the headrest.

BACKGROUND OF THE INVENTION

A conventional vehicle seat for a motor vehicle typically includes a headrest which is fastened to a backrest of the vehicle seat by headrest columns so as to be vertically adjustable. As a general rule, one of the headrest columns is usually provided with locking receiving features which are arranged spaced apart from one another in the longitudinal direction of the headrest column and in which, as an option, a locking mechanism engages. The locking mechanism is typically arranged on a guide unit which is arranged on the backrest such that the individual vertical positions of the headrest column are optionally lockable relative to the guide unit. The locking mechanism also serves to prevent the headrest column from being able to be pulled out of the guide unit when the locking mechanism is situated in a locking state. The locking mechanism is usually releasable or transferable into a release state by use of manually actuating a pressure element which is arranged on the guide unit to be movable. The other headrest column, usually without a corresponding locking mechanism, is mostly simply guided in its longitudinal direction on a further guide unit which is arranged on the backrest.

U.S. Pat. No. 7,410,219 generally relates to a fastening device for a headrest with two headrest columns of a vehicle seat. The fastening device includes a first guide sleeve for receiving a first headrest column in a vertically adjustable manner, a second guide sleeve for receiving a second headrest column in a vertically adjustable manner, a first receiving device which is secured to the backrest, in which the first guide sleeve is received and rests in at least two bearing points which are spaced apart axially from one another, and a second receiving device which is secured to the backrest, inside which the second guide sleeve is adjustable at least in the transverse direction. The second guide sleeve rests in the second receiving device which is secured to the backrest.

U.S. Pat. No. 9,403,456 generally relates to a headrest support structure of a seat for a mode of transport. The headrest support structure includes an upper frame which is provided with two fitting holes and forms a back frame, and two cylindrical headrest mounts which each fit into one of the two fitting holes in order to be fixed to the upper frame. A cross section of a fitting portion of each headrest mount, which fits into the corresponding fitting hole, comprises an asymmetrical design about a fitting axis parallel to a fitting direction in which the headrest mount fits into the fitting hole, the cross section being a cross section in a direction orthogonal to the fitting axis. The two fitting holes are realized in such a manner that each headrest mount only fits in one of the two fitting holes which is arranged at a position which is determined as a fixing position of the headrest mount.

U.S. Pat. No. 8,474,913 generally discloses a guide sleeve for a vehicle seat with a body portion which is adapted for insertion into a horizontal support of a vehicle seat arrangement. The body portion includes a plurality of engagement elements which extend radially outward from a center of the body portion.

U.S. Pat. No. 5,927,813 generally discloses an improved arrangement for the combination of a headrest bracket and a mount for use with a vehicle seat. The arrangement includes a force-receptive part which is defined in the headrest bracket, a releasable anti-rotation part which is defined between the headrest bracket and the mount and a decoupling part which is defined between the bracket mount and a lower end of the mount. Normally, a pair of hook-like end parts of the headrest bracket engage an engagement end portion of the mount, under resistance of the releasable anti-rotation part, however, using a screwdriver or the like, a high rotary force can be received by use of the force-receptive part and applied to the mount, which is sufficient in order to overcome the resistance in order to release the two hook-like end parts from the lower end of the mount by use of the decoupling part. In this way, the headrest bracket can easily be removed from the mount without any difficult and risky processes.

U.S. Pat. No. 7,338,130 generally discloses a system and a method for installing and removing a headrest from a seat. The system and the method include measures for installing a headrest on a seat without using tools and for preventing the removal of the headrest during normal operation. The system and the method can also include measures for removing the headrest by actuating an internal locking device.

U.S. Pat. No. 8,038,220 generally discloses a vehicle headrest which is arranged so as to be steplessly vertically adjustable on a vehicle backrest by use of coil spring clamping, and releasing of a supporting column of the headrest.

It would be desirable to ensure correct mounting of headrest of a vehicle seat on a backrest of the vehicle seat using an improved device that is simple and feasible.

SUMMARY OF THE INVENTION

According to one aspect of the present invention, a device for fastening a headrest of a vehicle seat to a backrest of the vehicle seat is provided. The device includes a first guide unit for receiving a portion of a first headrest column of the headrest in a vertically adjustable manner, a second guide unit for receiving a portion of a second headrest column of the headrest in a vertically adjustable manner, a first receiving unit fixed on the backrest and in which a sleeve-like portion of the first guide unit is received at least in part, and a second receiving unit fixed on the backrest and in which a sleeve-like portion of the second guide unit is received at least in part. The second guide unit comprises at least one locking mechanism for locking various vertical positions of the second headrest column relative to the second guide unit, and wherein at least one rib which extends in the longitudinal direction of the sleeve-like portion and extends over part of the longitudinal extension of the sleeve-like portion, is arranged on an outer lateral surface of each sleeve-like portion, wherein at least one recess in which the rib of the respective guide unit engages in a positive locking manner, is arranged on each receiving unit; and wherein a width of the rib of the first guide unit is greater than a width of the recess of the second receiving unit.

According to another aspect of the present invention, a vehicle seat headrest fastening device is provided. The vehicle seat headrest fastening device includes first and second guides each having at least one rib and receiving first and second headrest columns, and first and second receivers on a seat backrest receiving the first and second guides and each having at least one recess for engaging the at least one rib, wherein a width of a rib of the first guide is greater than a width of a recess of the second receiver.

According to yet another aspect of the present invention, a vehicle seat for a motor vehicle is provided. The vehicle seat for a motor vehicle includes a headrest having first and second headrest columns, a backrest which is connected to the headrest, a first guide unit for receiving a portion of a first headrest column of the headrest in a vertically adjustable manner, a second guide unit for receiving a portion of a second headrest column of the headrest in a vertically adjustable manner, a first receiving unit fixed on the backrest and in which a sleeve-like portion of the first guide unit is received at least in part, and a second receiving unit fixed on the backrest and in which a sleeve-like portion of the second guide unit is received at least in part. The second guide unit comprises at least one locking mechanism for locking various vertical positions of the second headrest column relative to the second guide unit. At least one rib which extends in the longitudinal direction of the sleeve-like portion and extends over part of the longitudinal extension of the sleeve-like portion, is arranged on an outer lateral surface of each sleeve-like portion, wherein at least one recess in which the rib of the respective guide unit engages in a positive locking manner, is arranged on each receiving unit, and wherein a width of the rib of the first guide unit is greater than a width of the recess of the second receiving unit.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the various figures, identical parts are always provided with the same reference symbols, which is why, as a general rule, such parts may be only described once.

Figure 1:
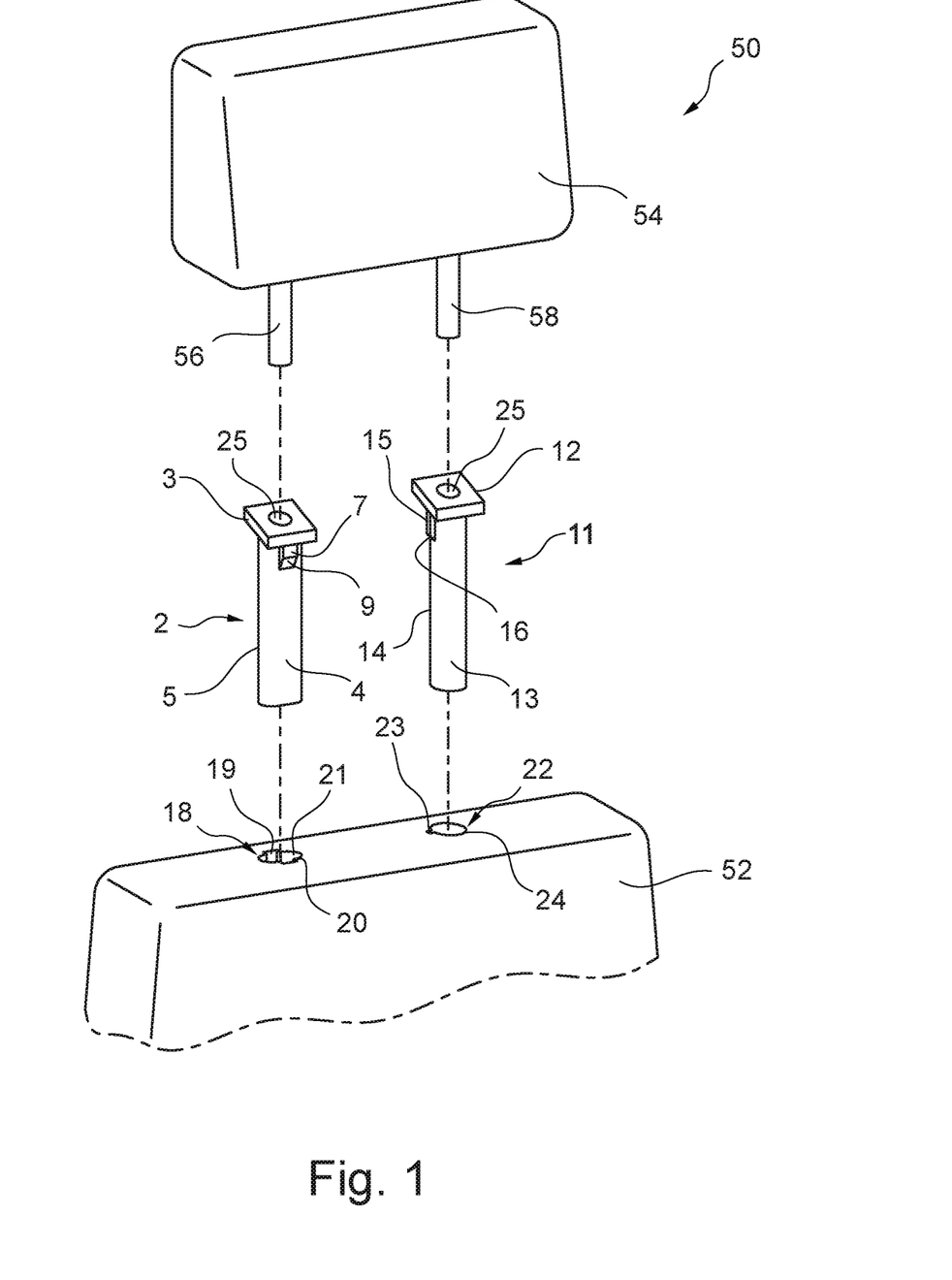
FIG. 1 is an exploded perspective view of an upper portion of a vehicle seat having a device for fastening a headrest to a seat back, according to a first embodiment.

FIG. 1 shows a schematic representation of a vehicle seat 50 having a device 1 according to a first embodiment for fastening a headrest 54 of the vehicle seat 50 to a backrest 52 of the vehicle seat 50. The vehicle seat may be used in a motor vehicle, such as a wheeled motor vehicle or other vehicles.

Figure 2A:
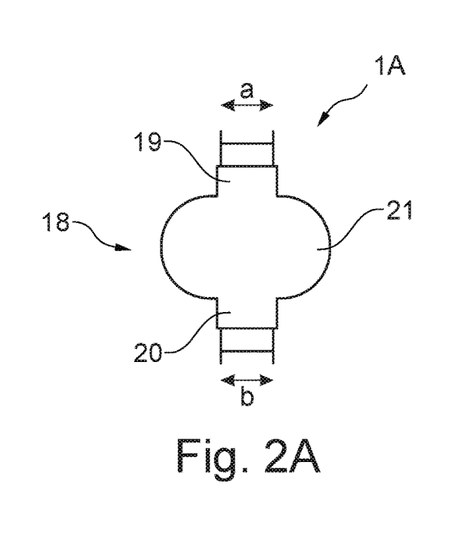
FIG. 2A is a schematic top view of the first receiving unit of the device of FIG. 1, according to a first embodiment.
Figure 2B:
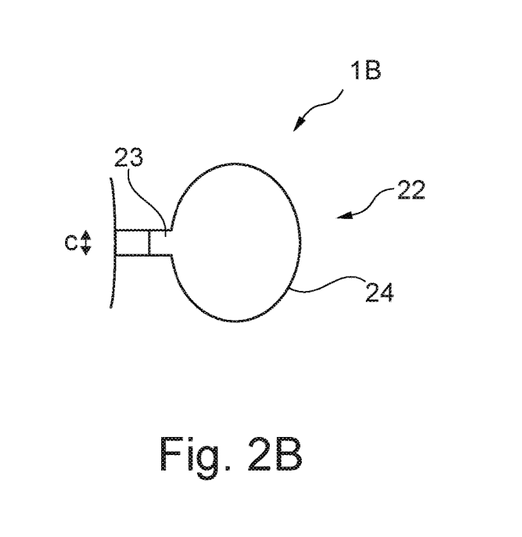
FIG. 2B is a schematic top view of the second receiving unit of the device of FIG. 1, according to a first embodiment.
Figure 2C:
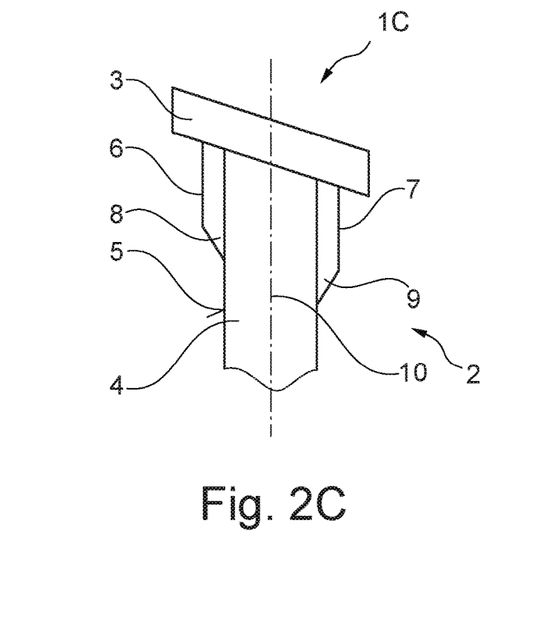
FIG. 2C is a schematic side view of a first guide unit of the device of FIG. 1, according to the first embodiment.
Figure 3:
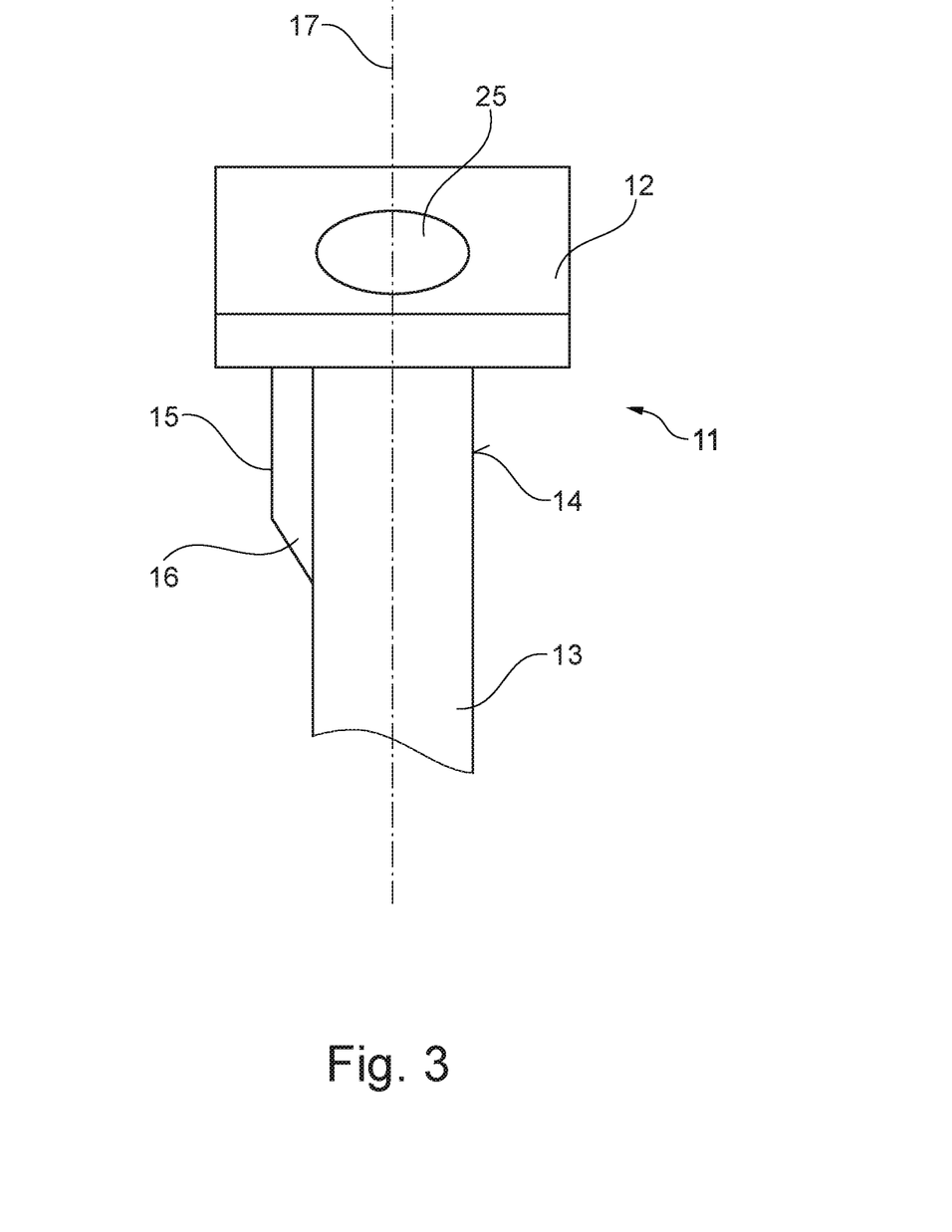
FIG. 3 is a schematic representation of the second guide unit shown in FIG. 1 from a different perspective.
Figure 4A:
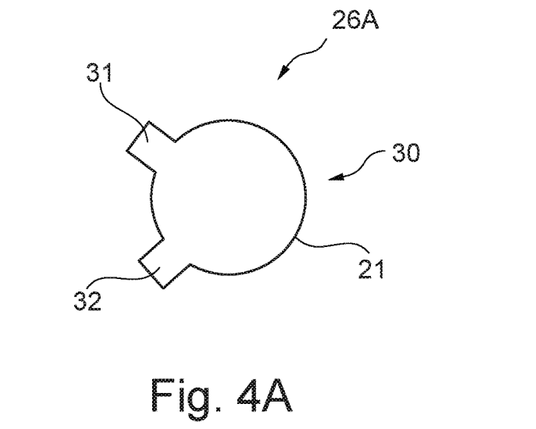
FIG. 4A is a schematic top view of a first receiving unit of a device, according to a second embodiment.
Figure 4B:
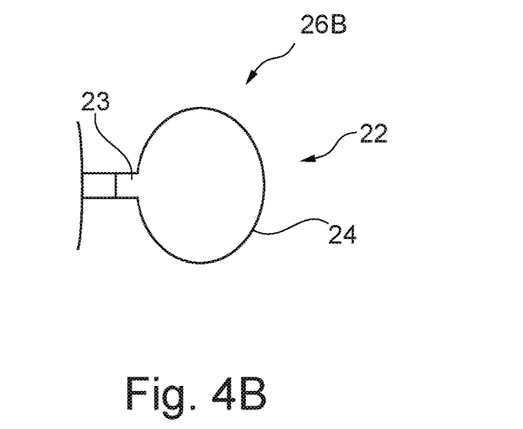
FIG. 4B is a schematic top view of a second receiving unit of a device, according to the second embodiment.
Figure 4C:
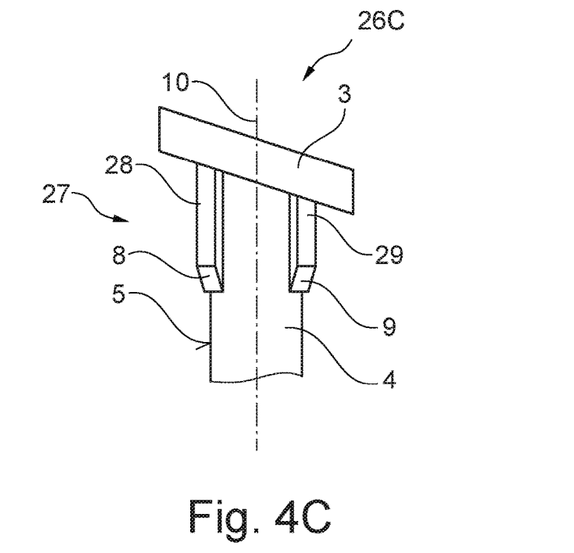
FIG. 4C is a schematic side view of a first guide unit for use with the device of FIG. 4A, according to the second embodiment.
Figure 4D:
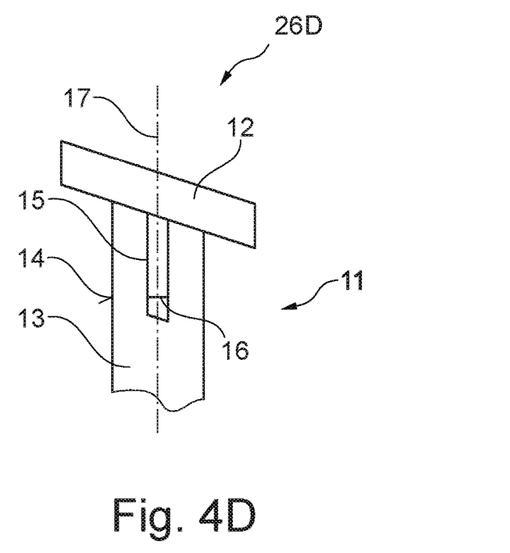
FIG. 4D is a schematic side view of a second guide unit for use with the device of FIG. 4B, according to the second embodiment.

The device 1 comprises a first guide unit 2 which is shown in more detail in FIG. 2C for receiving a portion of a first headrest column 56 of the headrest 54 in a vertically adjustable manner. The first guide unit 2 comprises a flange 3, which can be placed against the outside of the backrest 52 and on the one side of which a linear sleeve-like portion 4 is arranged. A through-bore 25 extends through the flange 3 and the sleeve-like portion 4, as indicated in FIGS. 1 and 3. Two ribs 6 and 7, which extend in the longitudinal direction of the portion 4, are arranged uniformly circumferentially offset with respect to one another and extend in each case over part of the longitudinal extension of the portion 4, are arranged on the outer lateral surface 5 of the sleeve-like portion 4 of the first guide unit 2. The two ribs 6 and 7 differ from one another in their respective widths, the width of the ribs 6 and 7 extending perpendicularly to the sheet plane. Each rib 6 or 7 comprises an insertion portion 8 or 9, the cross-sectional area of which is reduced in the direction of an end of the rib 6 or 7, shown at the bottom in FIG. 2C. The flange 3 is arranged at an angle to a longitudinal center axis 10 of the sleeve-like portion 4. Each rib 6 or 7 comprises a rectangular cross-sectional area.

Figure 2D:
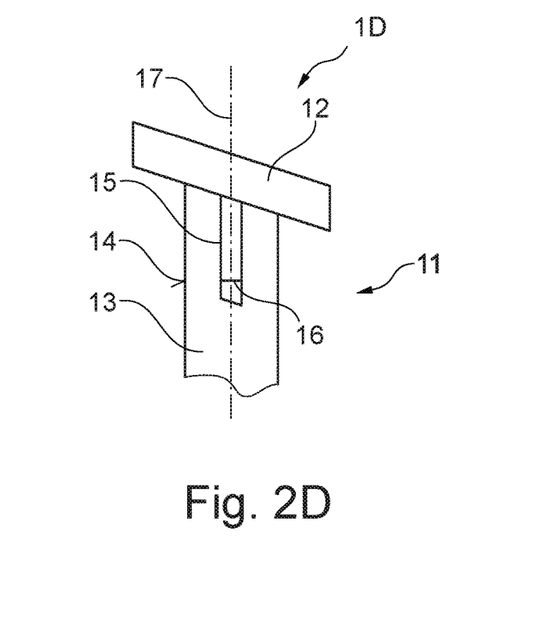
FIG. 2D is a schematic side view of a second guide unit of the device of FIG. 1, according to the first embodiment.

In addition, the device 1 comprises a second guide unit 11 which is shown in more tail in FIG. 2D for receiving a portion of a second headrest column 58 of the headrest 54 in a vertically adjustable manner. The second guide unit 11 comprises at least one locking mechanism (not shown) for locking various vertical positions of the second headrest column relative to the second guide unit 11. The locking mechanism serves at the same time to prevent the second headrest column from being able to be pulled out of the second guide unit 11 when the locking mechanism is situated in a locking state.

The second guide unit 11 comprises a flange 12 which can be placed against the outside of the backrest and on one side of which a linear sleeve-like portion 13 is arranged. A through-bore 25 extends through the flange 12 and the sleeve-like portion 13, as indicated in FIGS. 1 and 3. One single rib 15, which extends in the longitudinal direction of the portion 13 and extends over part of the longitudinal extension of the portion 13, is arranged on an outer lateral surface 14 of the sleeve-like portion 13 of the first guide unit 11. The rib 15 comprises an insertion portion 16, the cross-sectional area of which is reduced in the direction of an end of the rib shown at the bottom in FIG. 2D. The flange 12 is arranged at an angle to a longitudinal center axis 17 of the sleeve-like portion 13. The rib 15 comprises a rectangular cross section.

In addition, the device 1 comprises a first receiving unit 18 shown in FIG. 2A which is fixed or fixable on the backrest 52 and in which the sleeve-like portion 4 of the first guide unit 2 is received at least in part. Two recesses 19 and 20, which are arranged uniformly circumferentially offset with respect to one another corresponding to the first guide unit 2 and in which in each case one of the two ribs 8 and 9 of the first guide unit 2 can engage in a positive locking manner when the sleeve-like portion 4 of the first guide unit 2 is inserted into the first receiving unit 18, are arranged on the first receiving unit 18. The two recesses 19 and 20 differ from one another corresponding to the ribs 8 and 9 in their respective widths a or b, the width a being able to be smaller or greater than the width b. The first receiving unit 18 includes a sleeve portion 21, on which the recesses 19 and 20 are realized.

In addition, the device 1 comprises a second receiving unit 22 shown in FIG. 2B which is fixed or fixable on the backrest 52 and in which the sleeve-like portion 13 of the second guide unit 11 is receivable at least in part. A single recess 23, in which the rib 15 of the second guide unit 11 can engage in a positive locking manner when the sleeve-like portion 13 of the second guide unit 11 is inserted into the second receiving unit 22, is arranged on the second receiving unit 22. The width c of the recess 23 is smaller than the widths a and b of the recesses 19 and 20 of the first receiving unit 18 or smaller than the widths of the ribs 8 and 9 of the first receiving unit 2. The second receiving unit 22 includes a sleeve portion 24, on which the recess 23 is realized.

FIG. 3 shows a schematic representation of the second guide unit 11 shown in FIG. 1 from a different perspective. In particular, it is possible to see the through bore 25, which extends through the flange 12 and the sleeve-like portion 13 of the second guide unit 11, into which the second headrest column 58 is insertable at least in part. The first guide unit 2 likewise has a through-bore 25 for receiving the first headrest column 56.

FIGS. 4A-4D shows a schematic representation of a second embodiment of a device 26 for fastening a headrest of a vehicle seat to a backrest of the vehicle seat. The device 26 differs from the exemplary embodiment shown in FIGS. 1-3 in that the two ribs 28 and 29, which are arranged on the outer lateral surface 5 of the sleeve-like portion 4 of the first guide unit 27, are arranged non-uniformly circumferentially offset with respect to one another and the two recesses 31 and 32, which are arranged on the first receiving unit 30, are arranged correspondingly non-uniformly circumferentially offset with respect to one another. Reference is made to the above description concerning FIGS. 1, 2A-2D, and 3 to avoid repetition.

It should be appreciated that the features and measures mentioned individually in the following description are able to be combined together in an arbitrary technically sensible manner and demonstrate further designs of the device. The disclosure is additionally characterized and specified in the description, in particular in conjunction with the figures.

The disclosure relates to a device for fastening a headrest of a vehicle seat to a backrest of the vehicle seat, comprising a first guide unit for receiving a portion of a first headrest column of the headrest in a vertically adjustable manner, a second guide unit for receiving a portion of a second headrest column of the headrest in a vertically adjustable manner, a first receiving unit which is fixed or fixable on the backrest and in which a sleeve-like portion of the first guide unit is received at least in part, a second receiving unit which is fixed or fixable on the backrest and in which a sleeve-like portion of the second guide unit is received at least in part, wherein the second guide unit comprises at least one locking mechanism for locking various vertical positions of the second headrest column relative to the second guide unit, wherein at least one rib, which extends in the longitudinal direction of the portion and extends over part of the longitudinal extension of the portion, is arranged on an outer lateral surface of each sleeve-like portion, and wherein at least one recess, in which the rib of the respective guide unit engages in a positive locking manner, is arranged on each receiving unit.

According to the disclosure, it is not possible, when mounting a headrest on the backrest, for two first guide units to be inadvertently arranged on the backrest instead of the first guide unit and the second guide unit. Such incorrect mounting may be problematic with regard to safety aspects, as in the case of an accident, there would be no certainty that the headrest would remain on the backrest. This is because the first guide unit does not comprise any locking mechanism, as is present on the second guide unit, but just carries the first headrest column in a vertically adjustable manner. If mounted incorrectly, the two headrest columns could therefore easily be pulled out of the first guide units. In addition, the disadvantage of incorrect mounting would be that it would not be possible to lock the respective vertical position of the headrest relative to the backrest, which would result in customer claims and repair costs.

As the width of the rib of the first guide unit is greater than the width of the recess of the second receiving unit, the rib cannot be inserted into said recess and consequently the first guide unit cannot be arranged on the second receiving unit but purely on the first receiving unit. As a result, the two first guide units are reliably prevented from being used for fastening the head rest on the backrest. Consequently, correct mounting of the headrest on the backrest is ensured with the device. No cost-intensive monitoring systems for monitoring the correct mounting are additionally necessary for this purpose, for example camera monitoring or the like. The fact that the width of the first rib of the first guide unit is greater than the width of the recess of the second receiving unit also means that the width of the rib of the second guide unit is smaller than the width of the rib of the first guide unit and that the width of the recess of the second receiving unit is smaller than the width of the recess of the first receiving unit, as otherwise it would not be possible to realize any positive locking closure between the respective rib and the respective recess. The ribs and recesses serve at the same time as anti-rotation systems for the guide units relative to the receiving units.

The guide units can be produced in part or entirely from a plastics material. The guide units can be secured on the respective receiving unit by means of a latching or clamping mechanism. Each guide unit can comprise a flange which rests on the outside of the backrest, to the one side of which connects the sleeve-shaped portion, which can be realized in a linear manner or at an angle. The locking mechanism of the second guide unit preferably serves additionally to prevent the second headrest column from being able to be pulled out of the second guide unit. For removing the headrest from the backrest, the locking mechanism has to be transferred manually into a release state by use of an actuating element which is arranged on the second guide unit. The ribs of the first guide units can be produced in a monolithic manner with the respective remaining guide unit. In cross section, the respective rib can have a polygonal form or a form which is rounded radially on the outside.

The receiving units can be fixed permanently, for example with a substance-to-substance bond, to an inner structure of the backrest. As an alternative to this, the receiving units can be fixable to the inner structure of the backrest in a non-destructively releasable manner, for example by use of screw or rivet connections. For receiving the sleeve-like portion of the respective guide unit in a full or partial manner, each receiving unit can comprise a receiving sleeve, on which the at least one recess is arranged.

According to an advantageous design, two ribs, which extend in the longitudinal direction of the portion, are arranged uniformly circumferentially offset with respect to one another and extend in each case over part of the longitudinal extension of the portion, are arranged on the outer lateral surface of the sleeve-like portion of the first guide unit, wherein two recesses, which are arranged uniformly circumferentially offset with respect to one another in a corresponding manner and in which one of the two ribs engages in a positive locking manner, are arranged on the first receiving unit and wherein the two ribs differ from one another in their respective width. As a result, it is ensured that the first guide unit can only be arranged in a certain rotary position relative to the first receiving unit on the first receiving unit, which ensures the correct arrangement of the headrest on the backrest also with reference to this aspect. As the two ribs engage in a positive locking manner in the respective recesses and the two ribs differ from one another in their respective widths, the two recesses also differ from one another in their respective widths.

According to a further advantageous design, two ribs which extend in the longitudinal direction of the portion, are arranged non-uniformly circumferentially offset with respect to one another and extend in each case over part of the longitudinal extension of the portion, are arranged on the outer lateral surface of the sleeve-like portion of the first guide unit, wherein two recesses, which are arranged non-uniformly circumferentially offset with respect to one another in a corresponding manner and in which one of the two ribs engages in a positive locking manner, are arranged on the first receiving unit. As a result, it is ensured that the first guide unit can only be arranged on the first receiving unit in a certain rotary position relative to the first receiving unit, which ensures the correct arrangement of the headrest on the backrest also with reference to this aspect. The width of the ribs or recesses can be identical or different in this connection.

A further advantageous design provides that at least one rib comprises an insertion portion, the cross-sectional area of which is reduced in the direction of an end of the rib which has first of all been inserted into the respective recess. As a result, the insertion of the sleeve-like portion of the respective guide unit into the respective receiving unit is facilitated, in particular when there is a press fit between the receiving unit and the guide unit inserted therein in order to secure the guide unit on the receiving unit in a non-movable manner. The insertion portion can be realized, for example, in the shape of a ramp or as a rounding.

The above disclosure is additionally achieved by a vehicle seat with at least one device according to one of the afore-named designs or an arbitrary combination of at least two of the disclosed devices designed with one another.

The advantages named above with reference to the device are correspondingly connected to the vehicle seat. The vehicle seat can be a front seat or a rear seat of the motor vehicle. The headrest columns connected can be parts of a bracket which is realized in one piece. In addition, the headrest columns can be realized in a straight line or in a curved manner.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A device for fastening a headrest of a vehicle seat to a backrest of the vehicle seat, comprising:
   a first guide unit for receiving a portion of a first headrest column of the headrest in a vertically adjustable manner;
   a second guide unit for receiving a portion of a second headrest column of the headrest in a vertically adjustable manner;
   a first receiving unit fixed on the backrest and in which a sleeve portion of the first guide unit is received at least in part;
   a second receiving unit fixed on the backrest and in which a sleeve portion of the second guide unit is received at least in part; and
   wherein at least one rib which extends in the longitudinal direction of the sleeve portion and extends over part of the longitudinal extension of the sleeve portion, is arranged on an outer lateral surface of each sleeve portion, wherein at least one recess in which the rib of the respective guide unit engages in a positive locking manner, is arranged on each receiving unit; and wherein a width of the rib of the first guide unit is greater than a width of the recess of the second receiving unit, and wherein two ribs, which extend in the longitudinal direction of each sleeve portion, are arranged non-uniformly circumferentially offset with respect to one another and extend over part of the longitudinal extension of each sleeve portion are arranged on the outer lateral surface of the sleeve portion of the first guide unit, and two recesses, which are arranged non-uniformly circumferentially offset with respect to one another in a corresponding manner and in which one of the two ribs engages in a positive locking manner, are arranged on the first receiving unit.

2. The device as claimed in claim 1, wherein the two ribs differ from one another in their respective widths.

3. The device as claimed in claim 1, wherein at least one rib comprises an insertion portion, the cross-sectional area of which is reduced in the direction of an end of the rib which has first been inserted into the respective recess.

4. A vehicle seat headrest fastening device comprising:
   first and second guides each having at least one rib and receiving first and second headrest columns; and
   first and second receivers on a seat backrest receiving the first and second guides and each having at least one recess for engaging the at least one rib, wherein a width of a rib of the first guide is greater than a width of a recess of the second receiver, wherein at least one rib comprises an insertion portion, the cross-sectional area of which is reduced in the direction of an end of the rib which has first been inserted into the respective recess.

5. The device as claimed in claim 4, wherein the first and second headrest columns are received in the respective first and second guides in a vertically adjustable manner.

6. The device as claimed in claim 4, wherein the first and second receivers receive sleeve portions of the first and second guides and the at least one rib is located on each sleeve portion.

7. The device as claimed in claim 6, wherein the at least one rib extends longitudinally on an outer lateral surface of each sleeve portion of the first and second guides.

8. The device as claimed in claim 6, wherein two ribs, which extend in the longitudinal direction of each sleeve portion, are arranged uniformly circumferentially offset with respect to one another and extend over part of the longitudinal extension of each sleeve portion, are arranged on the outer lateral surface of the sleeve portion of the first guide, wherein two recesses which are arranged uniformly circumferentially offset with respect to one another in a corresponding manner and in which one of the two ribs engages in a positive locking manner, are arranged on the first receiver and the two ribs differ from one another in their respective widths.

9. The device as claimed in claim 6, wherein two ribs, which extend in the longitudinal direction of each sleeve portion, are arranged non-uniformly circumferentially offset with respect to one another and extend over part of the longitudinal extension of each sleeve portion, are arranged on the outer lateral surface of the sleeve portion of the first guide, and two recesses, which are arranged non-uniformly circumferentially offset with respect to one another in a corresponding manner and in which one of the two ribs engages in a positive locking manner, are arranged on the first receiver.

10. A vehicle seat for a motor vehicle, comprising:
a headrest having first and second headrest columns;
a backrest which is connected to the headrest; and
a first guide unit for receiving a portion of a first headrest column of the headrest in a vertically adjustable manner;
a second guide unit for receiving a portion of a second headrest column of the headrest in a vertically adjustable manner;
a first receiving unit fixed on the backrest and in which a sleeve portion of the first guide unit is received at least in part; and
a second receiving unit fixed on the backrest and in which a sleeve portion of the second guide unit is received at least in part;
wherein at least one rib which extends in the longitudinal direction of the sleeve portion and extends over part of the longitudinal extension of the sleeve portion, is arranged on an outer lateral surface of each sleeve portion, wherein at least one recess in which the rib of the respective guide unit engages in a positive locking manner, is arranged on each receiving unit, and wherein a width of the rib of the first guide unit is greater than a width of the recess of the second receiving unit, wherein at least one rib comprises an insertion portion, the cross-sectional area of which is reduced in the direction of an end of the rib which has first been inserted into the respective recess.

11. The vehicle seat as claimed in claim 10, wherein two ribs, which extend in the longitudinal direction of each sleeve portion, are arranged uniformly circumferentially offset with respect to one another and extend over part of the longitudinal extension of each sleeve portion, are arranged on the outer lateral surface of the sleeve portion of the first guide unit, wherein two recesses which are arranged uniformly circumferentially offset with respect to one another in a corresponding manner and in which one of the two ribs engages in a positive locking manner, are arranged on the first receiving unit and the two ribs differ from one another in their respective widths.

12. The vehicle seat as claimed in claim 10, wherein two ribs, which extend in the longitudinal direction of each sleeve portion, are arranged non-uniformly circumferentially offset with respect to one another and extend over part of the longitudinal extension of each sleeve portion, are arranged on the outer lateral surface of the sleeve portion of the first guide unit, and two recesses, which are arranged non-uniformly circumferentially offset with respect to one another in a corresponding manner and in which one of the two ribs engages in a positive locking manner, are arranged on the first receiving unit.

* * * * *